United States Patent [19]
Newton

[11] Patent Number: 5,567,138
[45] Date of Patent: Oct. 22, 1996

[54] METHOD AND APPARATUS FOR LIMITING ECCENTRIC DEVIATIONS OF A ROTATING POLISHED ROD IN ROTARY PUMPING APPLICATIONS

[76] Inventor: Hille Newton, 233 Grand Ave., Sylvan Lake, Alberta, Canada, T0M 1Z0

[21] Appl. No.: 494,782

[22] Filed: Jun. 26, 1995

[51] Int. Cl.[6] .................. F04C 2/107; E21B 43/00; F16C 23/02; F16C 27/06
[52] U.S. Cl. .................. 418/48; 418/270; 166/68.5; 384/196; 384/220; 384/266; 384/273
[58] Field of Search .................. 418/1, 48, 104, 418/270; 166/68.5, 78.1; 384/196, 220, 266, 273

[56] References Cited

U.S. PATENT DOCUMENTS

| | | | |
|---|---|---|---|
| 1,107,998 | 8/1914 | Persoons | 384/196 |
| 1,303,616 | 5/1919 | True | 384/266 |
| 1,887,315 | 11/1932 | Lindgren | 384/196 |
| 2,080,683 | 5/1937 | Yost et al. | 384/220 |
| 2,171,171 | 8/1939 | Brauer | 166/68.5 |

*Primary Examiner*—John J. Vrablik
*Attorney, Agent, or Firm*—Anthony R. Lambert

[57] ABSTRACT

A method for limiting eccentric deviations of a rotating polished rod which extends through a stuffing box in a downhole rotary pumping application. The method includes the step of positioning below the stuffing box at least two centralizing members having arcuate contact surfaces that engage the rotating polished rod to dampen eccentric deviations. According to another aspect of the present invention there is provided an apparatus having a housing with a central polished rod receiving passage. At least two centralizing members extend radially inwardly into the central polished rod receiving passage to engage a rotating polished rod positioned in the central polished rod receiving passage.

3 Claims, 2 Drawing Sheets

METHOD AND APPARATUS FOR LIMITING ECCENTRIC DEVIATIONS OF A ROTATING POLISHED ROD IN ROTARY PUMPING APPLICATIONS

FIELD OF THE INVENTION

The present invention relates to a method for limiting eccentric deviations of a rotating polished rod in rotary pumping applications, and an associated apparatus.

BACKGROUND OF THE INVENTION

In rotary pumping operations, a downhole pump stator and a downhole pump rotor are positioned within the well tubing. The well tubing is perforated in the vicinity of the rotor and stator allowing the entry of fluid therebetween. Upon rotation of the downhole pump rotor, fluid is carried up the well tubing to the production flow tee. In order to rotate the downhole pump rotor, the rotor is connected by a coupling to a sucker rod. In many installations a plurality of sucker rods are used. The sucker rod is, in turn, connected by a coupling to a polished rod. The polished rod extends through a stuffing box and has mounted on its remote end a drive pulley. The drive pulley engages a belt from a drive motor which imparts a rotational force via the polished rod and sucker rod to the downhole pump rotor.

The primary function of the stuffing box is to prevent a leakage of fluid up past the rotating polished rod. The polished rod is typically between 20 and 40 feet long, only a small portion of which is positioned within the stuffing box. The polished rod is, in turn, connected to at least one sucker rod, which is typically 25 feet long. This combined length of rotating rod unavoidably has eccentric deviations. These eccentric deviations accelerate wear, thereby reducing the useful life of the stuffing box.

SUMMARY OF THE INVENTION

What is required is a method for limiting eccentric deviations of the rotating polished rod.

According to one aspect of the present invention there is provided a method for limiting eccentric deviations of a rotating polished rod which extends through a stuffing box in a downhole rotary pumping application. The method includes the step of positioning below the stuffing box at least two centralizing members having arcuate contact surfaces that engage the rotating polished rod to dampen eccentric deviations.

According to another aspect of the present invention there is provided an apparatus for limiting eccentric deviations of a rotating polished rod. The apparatus includes a housing having a central polished rod receiving passage. At least two centralizing members extend radially inwardly into the central polished rod receiving passage. Each of the centralizing members has arcuate contact surface adapted to engage a rotating polished rod positioned in the central polished rod receiving passage. Means is provided for applying a force to the at least two centralizing members to move the centralizing members radially inwardly. The arcuate contact surfaces of said centralizing members engage a rotating polished rod positioned in the central polished rod receiving passage, thereby dampening eccentric deviations of said rotating polished rod.

It is preferred that the means for applying a force to each of the centralizing members include a tension adjustment screw for each centralizing member. Each tension adjustment screw has a first end and a second end. The first end is positioned outside of the housing. The tension adjustment screw extends into and threadedly engages the housing. The second end of the tension adjustment member directly or indirectly engages one of the centralizing members. Rotation of the tension adjustment screw in a first direction results in the tension adjustment screw extending further into the housing thereby pushing upon the centralizing member to increase the force said centralizing member exerts upon the rotating polished rod. Rotation of the tension adjustment screw in a second direction results in the tension adjustment screw being partially retracted from the housing thereby reducing the force exerted upon the centralizing member and the force the centralizing member exerts upon the rotating polished rod.

Although beneficial results may be obtained through the use of the apparatus, as described above, if the centralizing members are too rigidly fixed, excessive wear can occur to both the polished rod and the apparatus as a result of the eccentric deviations. Even more beneficial results may be obtained when the means for applying a force to each of the centralizing members includes a resilient shock absorbing member whereby shock caused by eccentric deviations of the rotating polished rod is absorbed.

BRIEF DESCRIPTION OF THE DRAWINGS

These and other features of the invention will become more apparent from the following description in which reference is made to the appended drawings, wherein.

DETAILED DESCRIPTION OF THE PREFERRED EMBODIMENT

Figure 1:
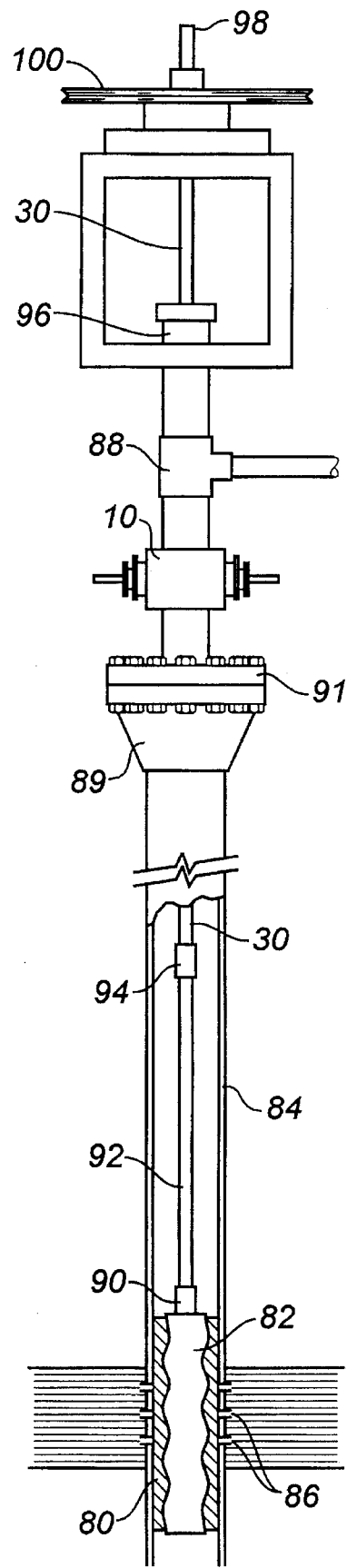
FIG. 1 is a side elevation view partially in section of a downhole rotary pump installation in accordance with the teachings of the present invention.

The preferred embodiment, an apparatus for limiting eccentric deviations of a rotating polished rod generally identified by reference numeral 10, will now be described with reference to FIGS. 1 and 2.

Figure 2:
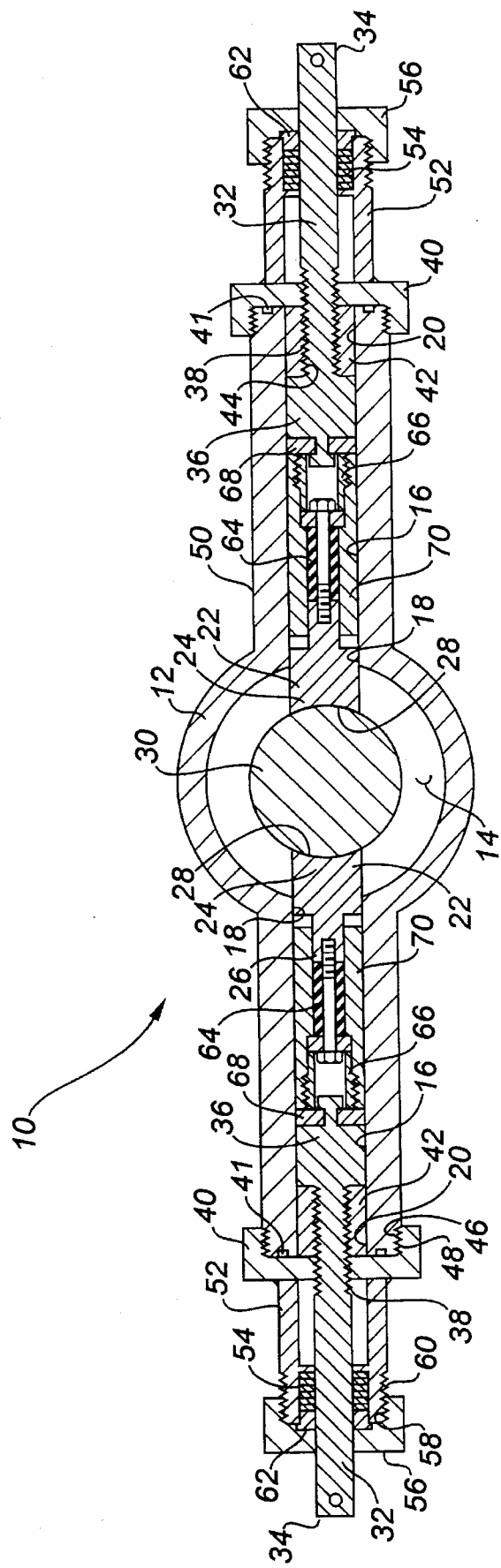
FIG. 2 is top plan view in section of an apparatus constructed in accordance with the teachings of the present invention.

Referring to FIG. 2, apparatus 10 includes a housing 12 having a central polished rod receiving passage 14 and two radial passages 16. Each of radial passages 16 have a first end 18 and a second end 20. First end 18 of each of radial passages 16 communicates with central polished rod receiving passage 14. Centralizing members 22 are positioned in each of radial passages 16. Each of centralizing members 22 has a first end 24 and a second end 26. First end 24 of each of centralizing members 22 extends radially inwardly into central polished rod receiving passage 14. Each of centralizing members 22 has an arcuate contact surface 28 at first end 24 adapted to engage a rotating polished rod 30 positioned in central polished rod receiving passage 14. Centralizing members 22 serve to dampen eccentric deviations of rotating polished rod 30, as will hereinafter be further described. A tension adjustment screw 32 extends into second end 20 of each of radial passages 16 in housing 12. Each tension adjustment screw 32 has a first end 34 and a second end 36. First end 34 is positioned outside of housing 12 where it is accessible for the purpose of making a rotational adjustment. Each tension adjustment screw 32 has external threads 38. For ease of assembly and to facilitate sealing, second end 20 of each of radial passages 16 a dual end cap configuration. A first end cap 40 has an internal sleeve 42 with internal threads 44 that engage external threads 38 of tension adjustment screw 32. First end cap 40 is maintained in position by a second set of internal threads 46 which engage external threads 48 on an exterior surface 50 of housing 12. O ring seals 41 are positioned to prevent leakage from first end cap 40. Attached to first end cap 40 is a packing housing 52 that contains packing 54. Packing housing 52 is closed by a second end cap 56. Second end cap 56 is maintained in position by a set of internal threads 58 which engage external threads 60 on packing housing 52. A packing bushing 62 is disposed between second end cap 56 and packing 54. When second end cap 56 is screwed onto packing housing 52, packing bushing 62 compresses packing 54. A resilient shock absorbing spring member 64 is positioned in each of radial passages 16 between second end 26 of centralizing member 22 and second end 36 of tension adjustment screw 32. Resilient shock absorbing spring member 64 absorbs shock caused by eccentric deviations of rotating polished rod 30. The spring tension is adjustable by means of a tension adjustment assembly that includes a tubular adjustment screw 66 and a screw retainer 68 that mates with tubular adjustment screw 66. In order to facilitate movement of centralizing members 22, annular guide bushings 70 are provided.

Apparatus 10 is intended for installation as part of a downhole rotary pump installation. Referring to FIG. 1, such a downhole rotary pump installation is illustrated. A downhole pump stator 80 and a downhole pump rotor 82 are positioned downhole within a well tubing 84. Well tubing 84 has a plurality of perforations 86, which allow fluids to enter between downhole pump stator 80 and downhole pump rotor 82. Upon rotation of downhole pump rotor 82, fluid is carried up well tubing 84 to a production flow tee 88. Production flow tee is positioned on surface above the connection provided by a tubing bowl 89 and a tubing head adaptor 91. In order to rotate downhole pump rotor 82, it is connected by a first coupling 90 to a sucker rod 92. Although only one sucker rod is illustrated, it should be noted that in many installations a plurality of sucker rods are used to reach the desired depth. Sucker rod 92 is, in turn, connected by a second coupling 94 to polished rod 30. Polished rod 30 extends through a stuffing box 96. Mounted on a remote end 98 of polished rod 30 is a drive pulley 100. Drive pulley is intended for attachment to a belt (not shown) of a drive motor (not shown) which imparts a rotational force via polished rod 30 and sucker rod 92 to downhole pump rotor 82.

The use and operation of apparatus 10 will now be described with reference to FIGS. 1 and 2. The preferred method involves the step of positioning below stuffing box 96 at least two centralizing members 22 having arcuate contact surfaces 28 that engage rotating polished rod 30 to dampen eccentric deviations. Preferred apparatus 10, has housing 12 that is intended to be attached on surface immediately below production flow tee 88. This represents the most practical way of placing centralizing members 22 in the desired location. Once apparatus 10 is in position, adjustment is made by means of tension adjustment screws 32. Tension adjustment screws 32 are manually rotated by means of first ends 34 which are located outside of housing 12. Rotation of tension adjustment screws 32 in a first direction results in tension adjustment screw 32 extending further into radial passages 16 in housing 12 thereby pushing upon centralizing member 22 via resilient shock absorbing member 64 to increase the force centralizing member 22 exerts upon rotating polished rod 30. Rotation of tension adjustment screw 32 in a second direction results in tension adjustment screw 32 being partially retracted from radial passage 16 in housing 12 thereby reducing the force exerted upon centralizing member 22 via resilient shock absorbing member 64 and, consequently, the force centralizing member 22 exerts upon rotating polished rod 30.

It will be apparent to one skilled in the art that the dampening of eccentric deviations of polished rod 30 by apparatus 10, will lead directly to a prolonged life of stuffing box 96. It will also be apparent to one skilled in the art that modifications may be made to the illustrated embodiment without departing from the spirit and scope of the invention as hereinafter defined in the claims.

The embodiments of the invention in which an exclusive property or privilege is claimed are defined as follows:

1. An apparatus for limiting eccentric deviations of a rotating polished rod, comprising:

a housing having a central polished rod receiving passage;

at least two centralizing members extending radially inwardly into the central polished rod receiving passage, each of the centralizing members having contact surfaces adapted to engage a rotating polished rod positioned in the central polished rod receiving passage;

means for applying a force to the at least two centralizing members to move said centralizing members radially inwardly such that the contact surfaces of said centralizing members engage a rotating polished rod positioned in the central polished rod receiving passage, thereby dampening eccentric deviations of said rotating polished rod;

the means for applying a force to each of the centralizing members including a tension adjustment screw, each tension adjustment screw having a first end and a second end, the first end being positioned outside of the housing and the tension adjustment screw extending into and threadedly engaging the housing, the second end engaging one of the centralizing members, such that rotation of the tension adjustment screw in a first direction results in the tension adjustment screw extending further into the housing thereby pushing upon the centralizing member to increase the force said centralizing member exerts upon the rotating polished rod, and rotation of the tension adjustment screw in a second direction results in the tension adjustment screw being partially retracted from the housing thereby reducing the force exerted upon the centralizing member and the force the centralizing member exerts upon the rotating polished rod.

2. The apparatus for limiting eccentric deviations of a rotating polished rod as defined in claim 1, wherein the means for applying a force to each of the centralizing members includes a resilient shock absorbing member whereby shock caused by eccentric deviations of the rotating polished rod is absorbed.

3. An apparatus for limiting eccentric deviations of a rotating polished rod, comprising:

a housing having a central polished rod receiving passage, and at least two radial passages having a first end that communicates with the central polished rod receiving passage and a second end;

centralizing members positioned in each of the at least two radial passages, each of the centralizing members having a first end and a second end, the first end of each of the centralizing members extending radially inwardly into the central polished rod receiving passage, each of the centralizing members having arcuate contact surfaces at the first end adapted to engage a rotating polished rod positioned in the central polished rod receiving passage, thereby dampening eccentric deviations of said rotating polished rod;

a tension adjustment screw extending into the second end of each of the at least two radial passages in the housing, each tension adjustment screw having a first end positioned outside of the housing and a second end, each tension adjustment screw threadedly engaging the housing;

a resilient shock absorbing member positioned in each of the at least two radial passages, positioned between the second end of the centralizing member and the second end of the tension adjustment screw, whereby shock caused by eccentric deviations of the rotating polished rod is absorbed;

rotation of the tension adjustment screw in a first direction results in the tension adjustment screw extending further into one of the radial passages in the housing thereby pushing upon the centralizing member via the resilient shock absorbing member to increase the force the centralizing member exerts upon the rotating polished rod, rotation of the tension adjustment screw in a second direction results in the tension adjustment screw being partially retracted from the housing thereby reducing the force exerted upon the centralizing member via the resilient shock absorbing member and the force the shock absorbing member exerts upon the rotating polished rod.

\* \* \* \* \*